(12) United States Patent
Dickinson et al.

(10) Patent No.: US 9,294,408 B1
(45) Date of Patent: *Mar. 22, 2016

(54) ONE-TO-MANY STATELESS LOAD BALANCING

(71) Applicant: Amazon Technologies, Inc., Seattle, WA (US)

(72) Inventors: Andrew B. Dickinson, Seattle, WA (US); Bradley D. Roberts, Bellevue, WA (US); Colin J. Whittaker, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,699

(22) Filed: Sep. 26, 2014

Related U.S. Application Data

(63) Continuation of application No. 13/540,423, filed on Jul. 2, 2012, now Pat. No. 8,850,002.

(51) Int. Cl.
| | |
|---|---|
| *G06F 15/16* | (2006.01) |
| *H04L 12/803* | (2013.01) |
| *H04L 12/26* | (2006.01) |
| *H04L 29/08* | (2006.01) |

(52) U.S. Cl.
CPC .............. *H04L 47/125* (2013.01); *H04L 43/10* (2013.01); *H04L 67/1002* (2013.01); *H04L 67/1023* (2013.01); *H04L 67/2814* (2013.01)

(58) Field of Classification Search
CPC ............ H04L 67/1002; H04L 67/1023; H04L 67/2814
USPC .......................... 709/200–203, 217–227, 238
See application file for complete search history.

(56) References Cited

U.S. PATENT DOCUMENTS

| | | | |
|---|---|---|---|
| 6,370,584 B1 | 4/2002 | Bestavros et al. | |
| 6,470,389 B1 | 10/2002 | Chung et al. | |
| 7,130,967 B2 * | 10/2006 | Arimilli et al. | ............... 711/137 |
| 7,149,217 B2 | 12/2006 | Alexander et al. | |
| 7,631,078 B2 * | 12/2009 | Ackaouy et al. | ............... 709/225 |
| 7,881,208 B1 | 2/2011 | Nosella et al. | |
| 8,045,566 B2 | 10/2011 | Roeder | |

(Continued)

OTHER PUBLICATIONS

Office Action for U.S. Appl. No. 13/540,423, mailed on Jan. 9, 2014, Andrew B. Dickinson, "One-To-Many Stateless Load Balancing", 6 pages.

*Primary Examiner* — Moustafa M Meky
(74) *Attorney, Agent, or Firm* — Lee & Hayes, PLLC

(57) ABSTRACT

A stateless load balancer may route a request to a computing device without tracking state information of the communication connection that delivered the request. The stateless load balancer may receive a request that is initiated by a client device. The request may be transported to the stateless load balancer via a communication connection that includes a public destination internet protocol (IP) address. One of the routing devices in the stateless load balancer may obtain connection tuples of the communication connection that transported the request, in which the connection tuples include the public destination IP address. Once obtained, the routing device may generate a hash value from one or more connection tuples. Subsequently, the routing device may map the hash value to a target network address of a particular computing device in a cluster of multiple computing devices by accessing stored mapping data, and then route the request to the particular computing device for processing.

18 Claims, 8 Drawing Sheets

(56) References Cited

U.S. PATENT DOCUMENTS

| | | | |
|---|---|---|---|
| 8,176,495 B2 * | 5/2012 | Sen et al. | 718/105 |
| 8,234,390 B2 * | 7/2012 | Shanmugham | 709/229 |
| 8,248,928 B1 | 8/2012 | Wang et al. | |
| 8,325,645 B2 | 12/2012 | Shiroko et al. | |
| 8,386,637 B2 * | 2/2013 | Ly et al. | 709/238 |
| 8,755,283 B2 * | 6/2014 | Patel et al. | 370/236 |
| 8,850,002 B1 * | 9/2014 | Dickinson et al. | 709/224 |
| 2002/0055980 A1 | 5/2002 | Goddard | |
| 2004/0258073 A1 | 12/2004 | Alexander et al. | |
| 2006/0248194 A1 * | 11/2006 | Ly et al. | 709/226 |
| 2011/0013551 A1 | 1/2011 | Shiroko et al. | |
| 2012/0155266 A1 * | 6/2012 | Patel et al. | 370/235 |
| 2014/0185446 A1 * | 7/2014 | Patel et al. | 370/235 |

* cited by examiner

ONE-TO-MANY STATELESS LOAD BALANCING

CROSS-REFERENCE TO RELATED APPLICATION

This application is a continuation of, and claims priority to, co-pending, commonly owned, U.S. patent application Ser. No. 13/540,423 filed Jul. 2, 2012, and entitled "One-To-Many Stateless Load Balancing," which is herein incorporated by reference in its entirety.

BACKGROUND

Web service providers may use load balancing to distribute and balance workloads between computing devices across one or more data centers. The use of load balancing may optimize resource utilization, increase reliability through redundancy, maximize throughput, minimize response delays, and reduce device overloads. Load balancing across multiple computing devices may further provide scalability, as the work load may be distributed across more or fewer computing devices based on increases or decreases in demand.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
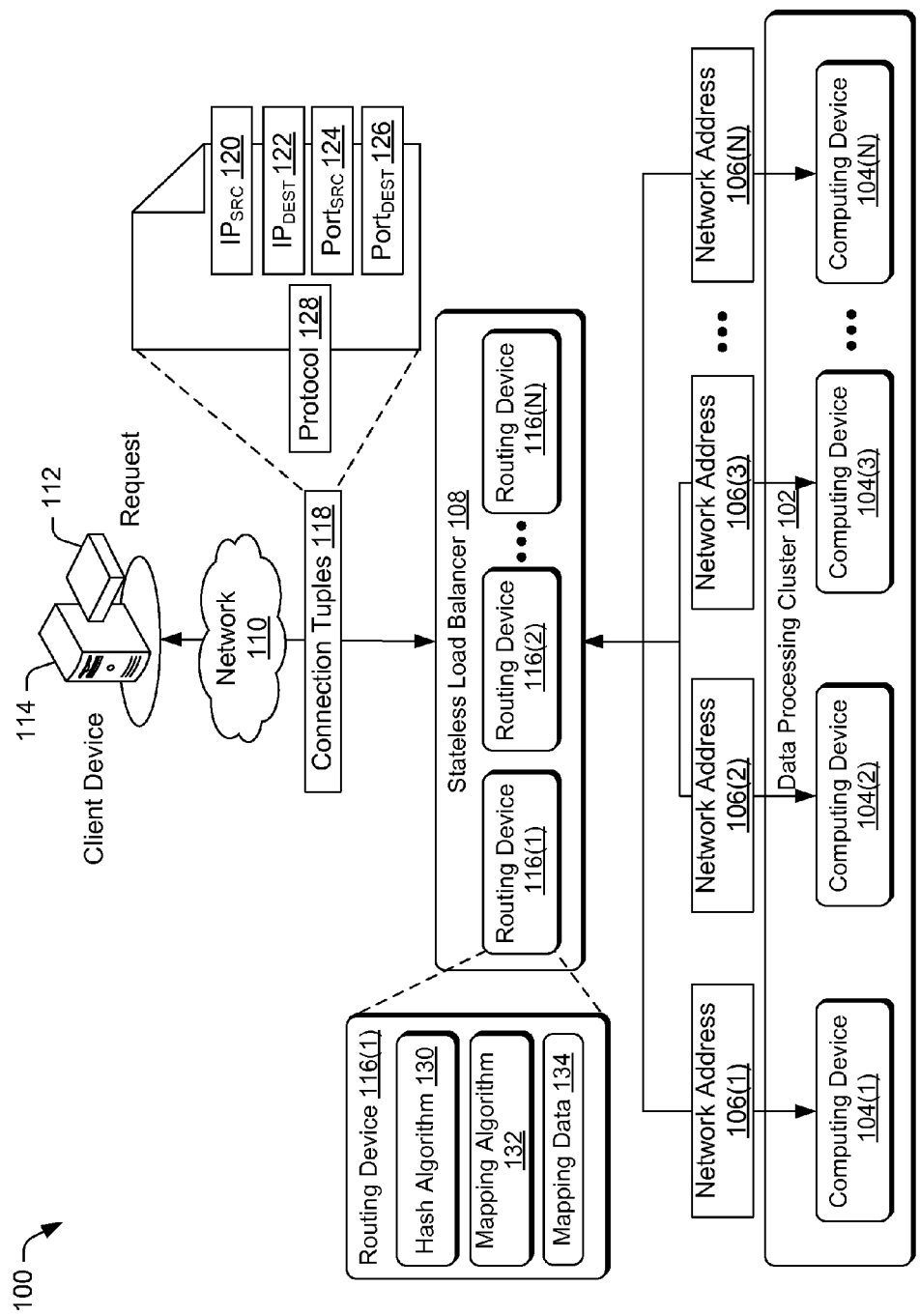
FIG. 1 is a schematic diagram of an illustrative architecture for implementing various embodiments of a stateless load balancer to balance loads between computing devices.

The disclosure is directed to architectures and techniques for using a stateless load balancer to balance workload between computing devices. A request from a client device may reach the stateless load balancer via a public destination internet protocol (IP) address. In various embodiments, the request may be a request to retrieve a web page, a request to access data, a request to establish a tunneling/socket session, and/or a request to process data using an application.

The stateless load balancer may obtain a set of connection tuples regarding the communication connection that delivered the request. The set of connection tuples may include a source IP address, a destination IP address, a source port number, a destination number, a protocol type, and/or other connection information that may in combination uniquely identify the corresponding request. The stateless load balancer may then hash one or more tuples from the connection tuples to generate a hash value. Subsequently, the stateless load balancer may map the hash value to a target network address of a computing device. The mapping may be performed using mapping data that correlate a list of hash values to a list of target network addresses, in which each target network address uniquely identifies one of the multiple computing devices. Accordingly, the stateless load balancer may deliver the request to the computing device with the mapped target network address for execution, and send the obtained result back to the client device.

In this way, the stateless load balancer may enable incoming requests to be received at a single destination IP address, and distributed via a one-to-many flow hash to multiple computing devices for execution. In contrast, a conventional stateful load balancer, such as a domain name system (DNS)-based load balancer, may use a DNS function to pass out multiple destination IP addresses to client devices. This distribution results in services requests being received at the DNS-based load balancer that have multiple destination IP addresses. The DNS-based load balancer then relies on a DNS translation function to translate each destination IP address of each incoming request to a private network address of a computing device that processes the request. Such issuance of multiple IP addresses and subsequently translation of the multiple IP addresses of incoming requests to private network addresses may mean that the DNS-based load balancer may be called upon to track a considerable amount of state information.

Thus, a stateless load balancer may offer superior performance over conventional stateful load balancers. A stateful load balancer may track the states of communication connections used by requests in order to route the requests. For example, the states tracked by a stateful load balancer for a request may include a type of a corresponding communication connection, a sequence number of the corresponding communication connection, initiation and acknowledgment information related to the corresponding communication connection. Accordingly, a computing device that is used to implement a stateful load balancer may devote a large amount of memory space and processing capacity to track such data in order to route requests. Further, when such a computing device fails, the state information tracked by the computing device and the associated communication connections may be irrevocably lost.

In contrast, because the stateless load balancer does not track state information in order to route requests, the stateless load balancer may be immune to failures caused by the loss of state information, and may offer faster performance while using the same amount of computing resources. Further, the lack of necessity to track state information also means that the stateless load balancer may be scaled up or down based on workload demand with minimal disruption to the execution of existing workloads.

Illustrative System Architecture

FIG. 1 is a schematic diagram of an illustrative architecture 100 for implementing various embodiments of a stateless load balancer to balance loads between computing devices. The architecture 100 may include a data processing cluster 102 that includes a plurality of computing devices, such as computing devices 104(1)-104(N). The data processing cluster 102 may be a part of a data center or multiple data centers. Each of the computing devices 104(1)-104(N) may be a computer, a server, a virtual machine, or any other virtual or real device that is capable of receiving an input, processing the input to generate an output, and returning the output. Each of the computing devices 104(1)-104(N) may be accessed through a corresponding unique target network address. Accordingly, the computing devices 104(1)-104(N) may have the target network addresses 106(1)-106(N). In at least some embodiments, a target network address may be a private network address (e.g., private IP address) of a computing device or a private network address of a subnet that hosts the computing device, in which the target network address is not discoverable by client devices outside of a private network.

The stateless load balancer 108 may receive requests from client devices via a network 110. For example, the stateless load balancer 108 may receive a request 112 from a client device 114. The network 110 may be a local area network ("LAN"), a larger network such as a wide area network ("WAN"), or a collection of networks, such as the Internet. The stateless load balancer 108 may include a plurality of network address translation (NAT)-based routing devices, such as routing devices 116(1)-116(N). The routing devices 116(1)-116(N) may work cooperatively to distribute requests to the computing devices 104(1)-104(N) in a distributed manner. A request may be a request to retrieve a web page, a request to access data, a request to establish a tunneling/socket session, and/or a request to process data using an application that resides in the data processing cluster 102.

The stateless load balancer 108 may route requests in a distributed manner to the computing devices 104(1)-104(N) based on connection information associated with the requests. For example, the stateless load balancer 108 may route the request 112 to one of computing devices 104(1)-104(N) based on connection tuples 118 of the request 112. The connection tuples 118 may include communication connection information that uniquely identify and distinguish the request 112 from other requests that are received by the data processing cluster 102. In at least one embodiment, the connection tuples 118 may include a source IP 120, a destination IP 122, a source port 124, a destination port 126, and a protocol 128. The source IP 120 may be the IP address of the client device 114 that sent the request 112. Likewise, the source port 124 is a port number that the client device 114 used to send the request 112. Additionally, the destination IP 122 may be an IP address of a device that received the request 112. In various instances, the destination IP 122 may be an IP address of the stateless load balancer 108, or an intermediate device that receives requests and passes the requests to the stateless load balancer 108. Thus, all of the requests that ultimately reach the stateless load balancer 108 may have the same destination IP address. Likewise, the destination port 126 may be a port number used by the stateless load balancer 108 or the intermediate device to receive the requests.

The protocol 128 may refer to the network communication protocol that is used to transmit the request 112 to the stateless load balancer 108. For example, the network communication protocol may be one of Hypertext Transfer Protocol (HTTP), Simple Mail Transfer Protocol (SMTP), TCP/IP, User Datagram Protocol (UDP), and/or so forth. In various embodiments, the stateless load balancer 108 may detect the protocol 128, and then use a correlation table to assign a numerical value to the detected protocol 128. The correlation table may provide a corresponding unique numerical value for each different protocol.

The routing devices 116(1)-116(N) may cooperatively distribute the requests to the computing devices 104(1)-104(N) because they use identical hash algorithms, identical mapping algorithms, and common mapping data. For example, the routing device 116(1) may include a hash algorithm 130 and a mapping algorithm 132. In order to route the request 112, the hash algorithm 130 may take as input the connection tuples 118, and generate a hash value based on the connection tuples 118. The hash algorithm 130 may be a simple hash function, a cryptographic hash function, or any other type of hash function.

The mapping algorithm 132 may use mapping data 134 to map a hash value to a corresponding target network address. In some embodiments, the mapping data 134 may be a mapping table that correlates particular ranges of hash values to target network addresses. For example, if the hash algorithm 130 is configured to produce an 8-bit binary value, then the hash algorithm 130 is at most capable of producing a total of 256 unique hash values for different inputs. Accordingly, in a scenario in which there are four computing devices in the data processing cluster 102, the mapping data 134 may map the first 64 unique hash values to a target network address of the first computing device in the data processing cluster 102, the second 64 unique hash values to a target network address of the second computing device, and so on and so forth. However, in other embodiments, the mapping algorithm 132 may use a modulo operation to obtain a remainder value from a hash value. In such embodiments, the mapping data 134 may be a mapping table that associates a first set of one or more modulo remainder values with a target network address of the first computing device in the data processing cluster 102, associates second set of one or more modulo remainder values with a second computing device, and so on and so forth.

Once the mapping algorithm 130 has correlated a hash value to a target network address, the routing device 116(1) may route the request 112 to the computing device that corresponds to the target network address for execution. For example, if the mapping algorithm 132 selected the target network address 106(1), the routing device 116(1) may send the request 112 to the computing device 104(1) for execution. Following the execution of the task, the routing device 116(1) may route the result of the task execution back to the client device 114.

Since all of the routing devices 116(1)-116(N) use identical hash algorithms, identical mapping algorithms, and common mapping data, each of the routing devices 116(1)-116(N) may route a particular request to the same computing device. Such uniformity of operation may ensure that the stateless load balancer 108 is easily scalable. Further, the stateless load balancer 108 may offer superior performance than a stateful load balancer. A stateful load balancer tracks the states of communication connections used by the requests in order to route the requests. For example, the states tracked by a stateful load balancer for a request may include the type of communication connection, the sequence number of the communication connection, the initiation and acknowledgment information related to the communication connections. Accordingly, a computing device that is used to implement a stateful load balancer may devote a large amount of memory space and processing capability to track such data in order to route requests. Further, when such a computing device fails, the states tracked by the computing device and the associated communication connections may be irrevocably lost. In contrast, because the stateless load balancer 108 does not track state information in order to route requests, the stateless load balancer 108 may be immune to failures caused by the loss of state information, and may offer faster performance while using the same amount of computing resources.

It will be appreciated while the connection tuples 118 is described in the embodiments above as including the source IP 120, the destination IP 122, the source port 124, the destination port 126, and the protocol 128, a set of connection tuples for a communication connection may include other information that uniquely identifies a communication connection. For example, the communication connection information may include a security parameters index (SPI) of an internet protocol security (IPsec) communication connection, a port number for a UDP communication connection, unique identifiers for sockets and tunneling communication connections, and/or so forth.

Example Server Modules

Figure 2:
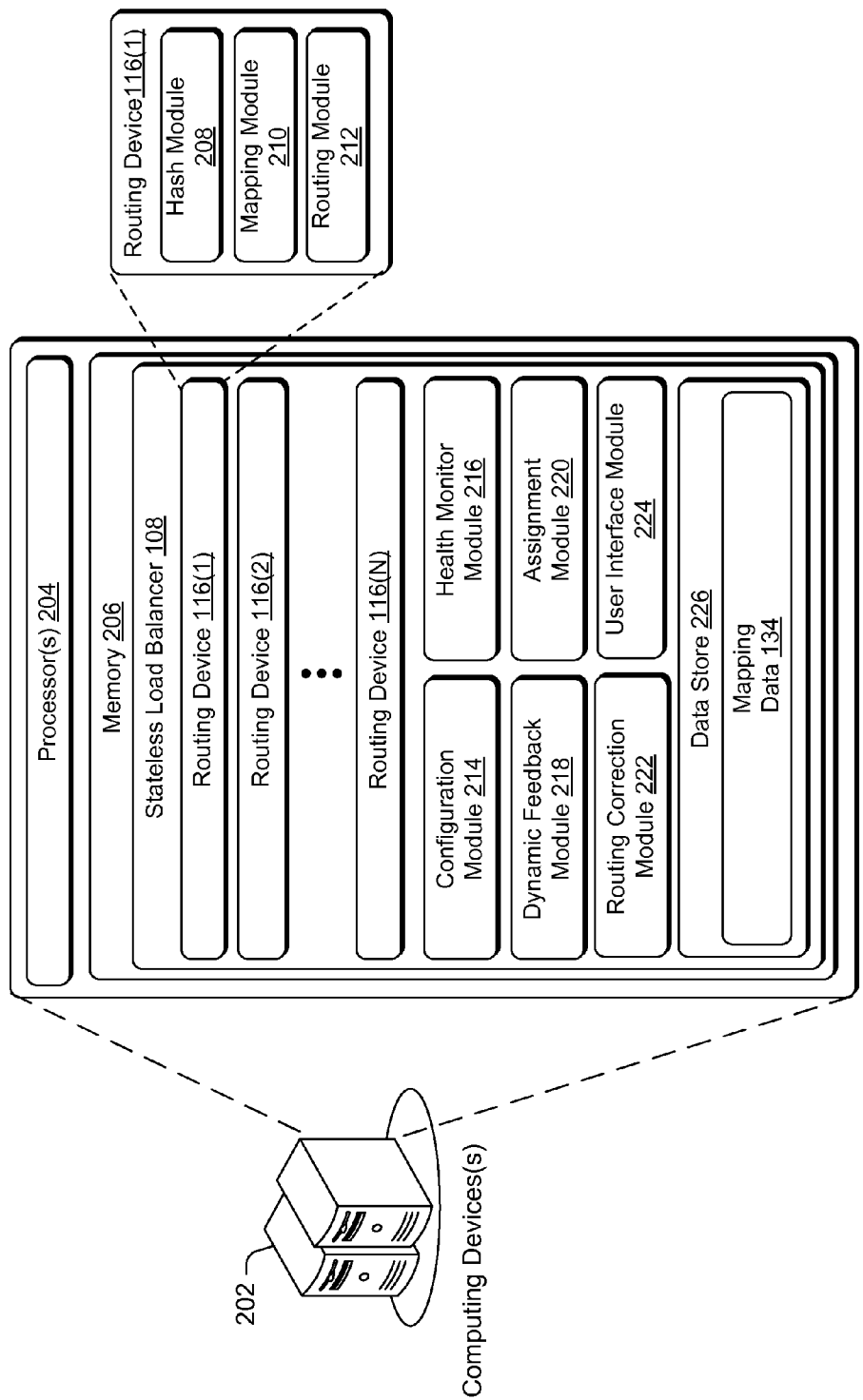
FIG. 2 is a schematic diagram of illustrative components in the stateless load balancer.

FIG. 2 is a schematic diagram of illustrative components in the stateless load balancer 108. The stateless load balancer 108 may be implemented by the computing device(s) 202. The computing device(s) 202 may include processor(s) 204 and memory 206. The memory 206 may include computer readable media. The computer readable media may include volatile and non-volatile, removable and non-removable media or memory implemented in any method or technology for storage of information such as computer readable instructions, data structures, program modules, or other data. The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks.

As described above, the stateless load balancer 108 may include the routing devices 116(1)-116(N). Each of the routing devices 116(1)-116(N) may be a computer, a server, a virtual machine, or any other virtual or real device that is capable of receiving an input, processing the input to generate an output, and returning the output. Since all the routing devices 116(1)-116(N) use identical modules to route requests in a similar manner, the description of the modules of the routing device 116(1) may serve to illustrate the modules of all the routing devices in the stateless load balancer 108.

The routing device 116(1) may include a hash module 208, a mapping module 210, and a routing module 212. The hash module 208 may implement the hash algorithm 130. In various embodiments, the hash module 208 may be configured to use a group of one or more tuples selected from a set of connection tuples, such as the set of connection tuples 118, to generate a hash value. The group of one or more selected tuples may uniquely identify a corresponding request. For example, in one instance, the hash module 208 may be configured to use the source IP 120, the destination IP 122, the source port 124, the destination port 126, and the protocol 128 to generate the hash value. However, in another instance, the hash module 208 may be configured to solely use the source IP 120, the destination IP 122, the source port 124, and the destination port 126, without the protocol 128, to generate a hash value.

The mapping module 210 may implement the mapping algorithm 132. As described above, the mapping algorithm 132 may use the mapping data 134 to correlate each hash value with a corresponding target network address. In turn, each unique target network address in the mapping data 134 identifies a corresponding routing device, such as one of the routing devices 116(1)-116(N). The routing module 212 may route each request according to a corresponding target network address that is obtained by the mapping module 210 for the communication connection of the request. In other words, the routing module 212 may direct a request to a computing device based on the obtained target network address. For example, the mapping module 210 may select the target network address 106(1) for the request 112 that is initiated by the client device 114. Accordingly, the routing module 212 may route the request 112 to the computing device 104(1) for execution. The execution of the request 112 may generate a result that the routing module 212 may route back to the client device 114.

The stateless load balancer 108 may further include a configuration module 214, a health monitor module 216, a dynamic feedback module 218, an assignment module 220, a routing correction module 222, and a user interface module 224. The stateless load balancer 108 may also include a data store 226. The configuration module 214 may designate to the routing devices 116(1)-116(N) the specific tuples in each set of connection tuples that are to be used by the respective hash modules to generate the hash values. For example, the configuration module 214 may configure each of the routing devices 116(1)-116(N) to disregard the available source port numbers of the communication connections for the incoming requests, and solely compute hash values based on the other tuples of the communication connections. Alternatively or concurrently, the configuration module 214 may also designate a specific source of mapping data, such as the mapping data that is stored in the data store 226, to be used by the routing devices 116(1)-116(N).

The health monitor module 216 may monitor the health statuses of the computing devices 104(1)-104(N) in the data processing cluster 102. For example, the health monitor module 216 may, for each computing device, monitor the health parameters such as the response time to read/write requests, the lifetime numbers of read and/or writes executed by the hardware associated with the computing device, the accumulated operation time of the hardware, the power consumption of the hardware, the operating temperature of the hardware, and/or so forth. By monitoring such health parameters of each computing device, the health monitor module 216 may detect the failures or predict the imminent failures of one or more computing devices. Accordingly, when the health monitor module 216 detects or predicts a failure of a particular computing device, the health monitor module 216 may use the assignment module 220 to change one or more relevant hash value to target network address correlations in the mapping data 134. For example, a correlation may be modified so that hash values that formerly correlate with the target network address of a particular computing device may instead correlate with one or more other target network addresses. In this way, requests that are formerly handled by a failed or failing computing device may be distributed to one or more other existing computing devices and/or one or more replacement computing devices in the data processing cluster 102.

The dynamic feedback module 218 may monitor workloads that are handled by each of the computing devices 104(1)-104(N) in predetermined time periods, as each computing device executes requests. By monitor the workloads, the dynamic feedback module 218 may detect imbalances in the workload. For example, a particular computing device may be executing tasks at maximum capacity, while another computing device may be periodically idle. The dynamic feedback module 218 may take into account the amount of the computing resources (e.g., processing power, memory, etc.) of each computing device while determining load imbalance. Accordingly, when the dynamic feedback module 218 detects a workload imbalance between multiple computing devices in a predetermined time period, the dynamic feedback module 218 may use the assignment module 220 to change the mapping data 134 to shift workloads between computing devices. Such modification may be accomplished with the change of mappings between hash values and target network addresses of computing devices in the mapping data 134.

Alternatively or concurrently, the dynamic feedback module 218 may also detect a deficiency or surplus in the amount of computing resources offered by the computing devices 104(1)-104(N) to handle the requests. For instance, the dynamic feedback module 218 may determine the average idle time of the computing devices 104(1)-104(N) in a predetermined time period. In such an instance, a mean idle time that is below a minimum time length threshold may cause the dynamic feedback module 218 to bring additional computing devices online to handle the requests. In contrast, a mean idle time for the computing devices 104(1)-104(N) that is above a maximum time length threshold may cause the dynamic feedback module 218 to scale back the number of computing devices that are handling the requests. The dynamic feedback module 218 may scale the number of computing devices up or down so that the mean idle time is within the minimum and maximum time length thresholds. In various embodiments, the dynamic feedback module 218 may also perform such scaling by using the assignment module 220.

The assignment module 220 may initially assign hash values to target network addresses of computing devices in the mapping data 134. The assignment of the hash values may be through direct correlations of one or more hash values to each target network address (e.g., of 09 of d2 7a dd→10.1.1.2), or indirectly through the use of modulo values that associate one or more hash values with each target network address (e.g., 3→10.1.1.3). In some embodiments, the assignment module 220 may perform such assignment via equal distribution, round robin distribution, random distribution, or distribution in proportion to the processing capability (e.g., processor power, amount of memory, amount of storage space, amount of network latency, and/or so forth) of each computing device in the data processing cluster 102.

In other embodiments, the assignment module 220 may assign the hash values to the target network addresses of computing devices based on specific configuration settings. For example, a configuration setting may call for a particular set of hash values to be assigned to one or more specific target network addresses. For example, the particular set of hash values may have been identified as correlating to requests from high value client devices. In such an example, the one or more specific target network addresses may be target network addresses of particular high performance and/or robust computing devices in the data processing cluster 102. In another example, the assignment module 220 may assign groups of hash values that have been identified as corresponding to requests originating from different geographical regions to respective different target network addresses of computing devices.

The assignment module 220 may further modify correlations between the hash values and target network addresses of computing devices in the mapping data 134. In one scenario, the assignment module 220 may perform a correlation modification that enables a replacement computing device to take on the workload of another computing device. In such a scenario, the assignment module 220 may break the association between one or more hash values and the target network address of a computing device in the mapping data 134. Subsequently, the assignment module 220 may correlate the one or more hash values with a target network address of a replacement computing device in the mapping data 134.

In another scenario, the assignment module 220 may perform a correlation modification that enables multiple replacement computing devices to take over the workload of a single computing device. In this scenario, the assignment module 220 may terminate the association between multiple hash values and the target network address of a computing device in the mapping data 134. Subsequently, the assignment module 220 may correlate a first set of hash values of the multiple hash values to a target network address of one replacement computing device in the mapping data 134. The assignment module 220 may further correlate a second set of hash values to a target network address of another replacement computing device, and if appropriate, so on and so forth until all of the multiple hash values have been assigned to corresponding computing devices in the mapping data 134. Each set of the hash values that is assigned to a replacement computing device may include one or more hash values. In various embodiments, the assignment module 220 may distribute the multiple hash values to the replacement computing devices equally or proportionally based on the processing capability of each replacement computing device. For example, a first replacement computing device that has twice the processing capability of as second replacement computing device may have its target network address correlated with twice the amount of hash values as the target network address of the second replacement computing device.

In a further scenario, the assignment module 220 may perform a correlation modification that enables a single replacement computing device to take on the workloads of multiple computing devices. In this scenario, the assignment module 220 may, for each of the multiple computing devices, terminate the associated between one or more hash values and the target network address of a corresponding computing device in the mapping data 134. Subsequently, the assignment module 220 may correlate the resultant unassociated hash values with a target network address of a replacement computing device in the mapping data 134.

In additional scenarios, the assignment module 220 may perform correlation modifications that shift the associations between multiple hash values and multiple target network addresses to more or fewer target network addresses. For example, there may be a total of 256 unique hash values currently associated with four target network addresses in the mapping data 134 by equal distribution. The assignment module 220 may add four new target network addresses to the mapping data 134 so that the 256 unique hash values may be equally distributed amongst and associated with eight target network addresses. Conversely, the assignment module 220 may remove two existing target network address from the mapping data 134, and distribute the 256 unique hash values equally among the remaining two target network addresses. In further embodiments, the shift in the correlation of the hash values to more or fewer target network addresses may not be implemented based on equal distribution, but rather in proportion based on the processing capability of each computing device. In various embodiments, the assignment module 220 may apply at least two of the correlation modifications described above in combination to modify correlations between the hash values and target network addresses of computing devices in the mapping data 134.

The routing correction module 222 may remedy communication connection problems that are caused by the correlation modifications to the mapping data 134 that are initiated by the health monitor module 216 and the dynamic feedback module 218. For instance, a first portion of the data for the request 112 may be sent to the computing device 104(1) for processing based on a first target network address that corresponds to a hash value. However, a second portion of the data for the request 112 may be sent to the computing device 104(2) for processing due to workload shifting initiated by the dynamic feedback module 218. The workload shifting may have resulted in the same hash value being mapped to the target network address of the computing device 104(2). The routing of data for a single request to two different computing devices may result in an error and the request 112 being unfulfilled. In such an instance, the routing correction module 222 may detect such a disruptive redistribution and move the second portion of the data for the request 112 from the computing device 104(2) back to the computing device 104(1), so that the request 112 may be processed by the computing device 104(1).

The user interface module 224 may enable an administrator to interact with the various modules of the stateless load balancer 108 using a user interface. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. Accordingly an administrator may use the user interface module 224 to direct the configuration module 214 to designate the connection tuples that are used to generate a hash value and/or sources of the mapping data. Further, the user interface module 224 may be used by the administrator to direct the mapping module 210 to modify the correlations between particular hash values and specific target network addresses.

The data store 226 may store the mapping data 134, as well as other data that are used by the stateless load balancer 108. In various embodiments, the mapping data 134 may be stored in the data store 226 as a data table, a data array, and/or other data storage structures.

Illustrative System Architectures

Figure 3:
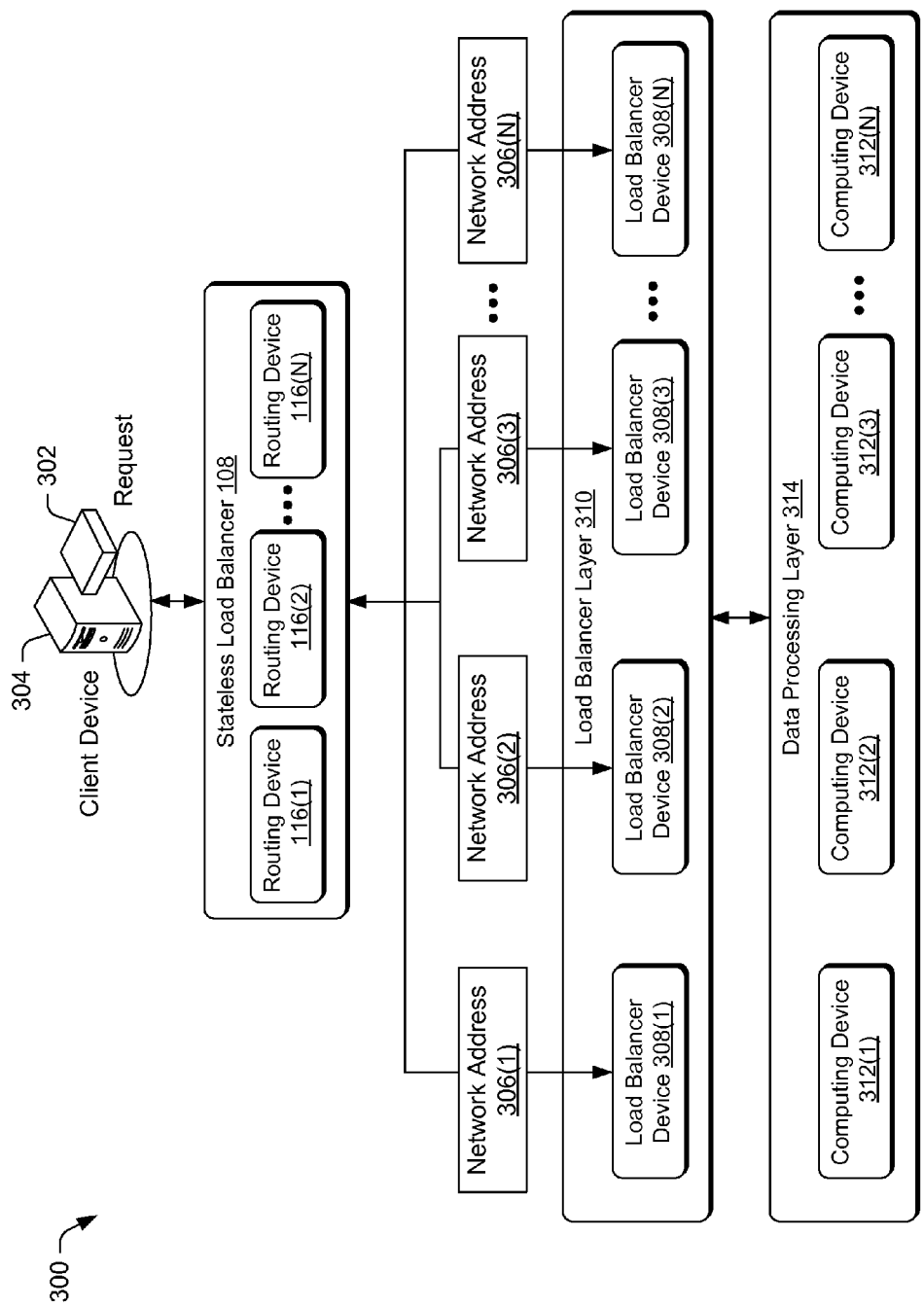
FIG. 3 is a schematic diagram of an illustrative architecture for implementing various embodiments of a stateless load balancer in conjunction with additional load balancer devices.

FIG. 3 is a schematic diagram of an illustrative architecture for implementing various embodiments of a stateless load balancer 108 in conjunction with additional load balancer devices. As described above, the stateless load balancer 108 may use the routing devices 116(1)-116(N) to generate hash values based on the connection tuples of incoming requests, such as the request 112. At least one of the incoming requests, such as the request 302, may have originated from a client device, such as the client device 304. The requests may have been routed to the stateless load balancer 108 through an initial network address that is a common public IP address. Subsequently, the stateless load balancer 108 may use mapping data to map each hash value to a corresponding target network address, such as one of the target network addresses 306(1)-306(N). In this way, the stateless load balancer 108 may route the incoming requests to devices having the target network addresses 306(1)-306(N).

However, unlike in the embodiments shown in FIG. 1, the target network addresses 306(1)-306(N) do not lead to computing devices in a data processing cluster. Instead, the target network addresses 306(1)-306(N) may belong to additional load balancer devices 308(1)-308(N) in a load balancer layer 310. In some embodiments, each of the additional load balancer devices may be a stateful load balancer, such as a DNS-based load balancer. For example, the load balancer device 308(1) may track communication connection information of the incoming requests in order to route each request to one of the computing devices 312(1)-312(N) in the data processing layer 314. Further, the load balancer devices 308(2)-308(N) may function in the same way as the load balancer device 308(1). In other embodiments, the load balancer devices 308(1)-308(N) may use round robin distribution, random distribution, or other distribution techniques to distribute the requests to the computing devices 312(1)-312(N) for execution.

In additional embodiments, each of the load balancer devices 308(1)-308(N) may function similarly as the routing devices 116(1)-116(N). In such embodiments, each of the computing devices 312(1)-312(N) may have a corresponding target network address. Accordingly, the load balancer device 308(1) may generate a secondary hash value for an incoming requested using one or more connection tuples of the communication connection associated with the incoming request, as well as the target network address of the load balancer device 308(1). Subsequently, the load balancer device 308 may correlate the secondary hash value to a target network address that belongs to one of the computing devices 312(1)-312(N) in the data processing layer 314 using a set of mapping data. The correlated target network address is then used to route the request to the corresponding computing device in the data processing layer 314 for execution.

Figure 4:
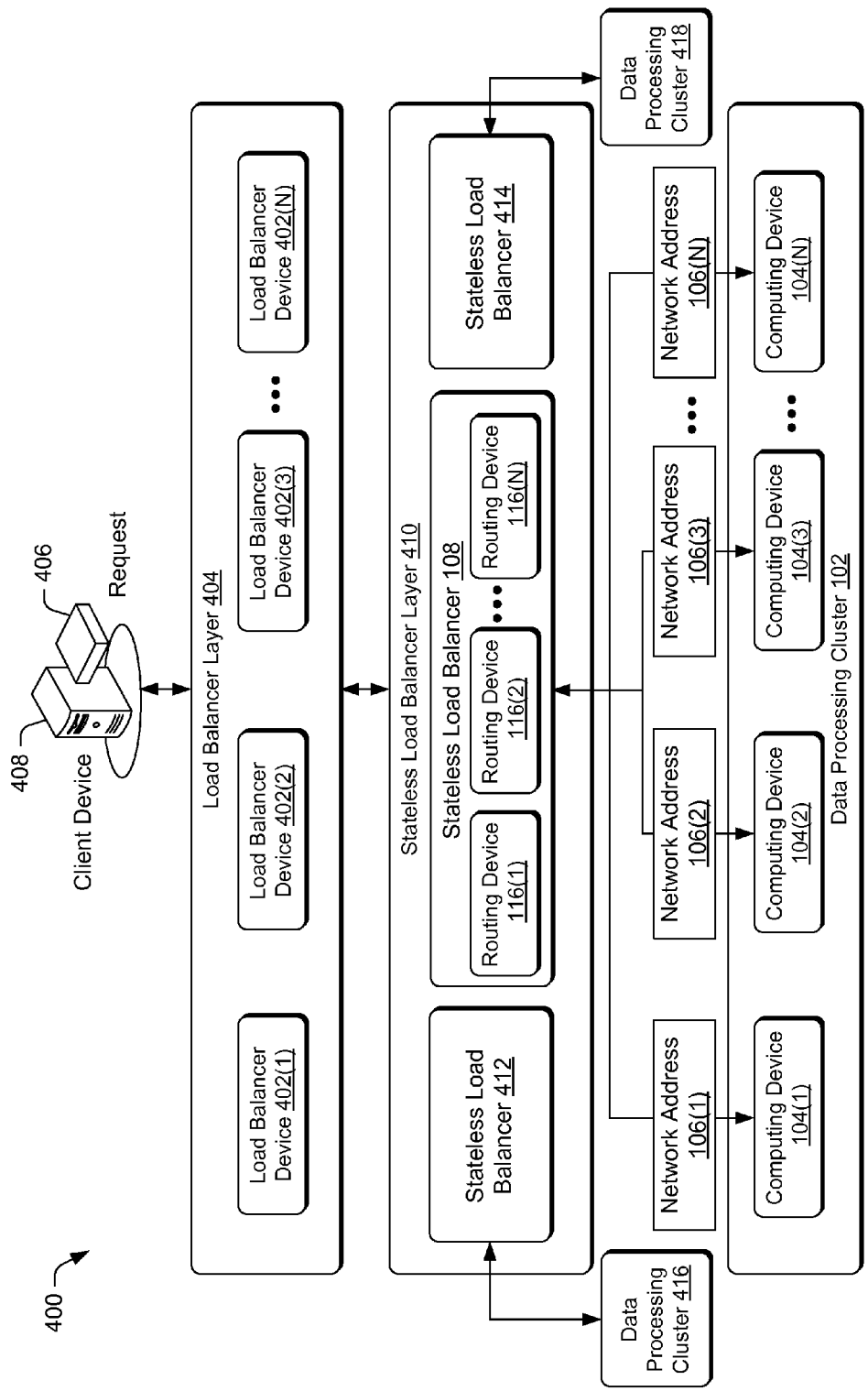
FIG. 4 is a schematic diagram of another illustrative architecture for implementing various embodiments of a stateless load balancer in conjunction with additional load balancer devices.

FIG. 4 is a schematic diagram of another illustrative architecture for implementing various embodiments of a stateless load balancer 108 in conjunction with additional load balancer devices. In this architecture, client devices may send requests to load balancer devices 402(1)-402(N) in a load balancer layer 404. In some embodiments, each of the load balancer devices 402(1)-402(N) may be a stateful load balancer, such as a DNS-based load balancer. For example, the load balancer device 402(1) may track communication connection information of an incoming request 406 from the client device 408 in order to route the request 406. However, rather than route incoming requests directly to computing devices for execution, the load balancer devices 402(1)-402(N) may route the requests to the stateless load balancers in a stateless load balancer layer 410. In other embodiments, the load balancer devices 402(1)-402(N) may use round robin distribution, random distribution, or other distribution techniques to distribute the requests to the stateless load balancers in the stateless load balancer layer 410.

The stateless load balancer layer 410 may include multiple stateless load balancers, such as the stateless load balancer 108, as well as the stateless load balancers 412 and 414. The actual number of stateless load balancers in the stateless load balancer layer 410 may be scaled up or down depending on the workload of the requests. As described above, the stateless load balancer 108 may use the routing devices 116(1)-116(N) to generate hash values based on the connection tuples of incoming requests, such as the request 406. Subsequently, the stateless load balancer 108 may use the mapping data 134 to correlate each hash value to a corresponding target network address, such as one of the target network addresses 106(1)-106(N). In this way, the stateless load balancer 108 may distribute the incoming requests to the computing devices 104(1)-104(N) with the target network addresses 106(1)-106(N). Further, the stateless load balancers 412 and 414 may operate in the same manner as stateless load balancer 108 to respectively route requests to computing devices in the data processing cluster 416 and the data processing cluster 418.

Illustrative Operations

FIGS. 5-8 show illustrative processes 500-800 that implement a stateless one-to-many load balancer. Each of the processes 500-800 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 500-800 are described with reference to the architectures 100, 300, and 400.

Figure 5:
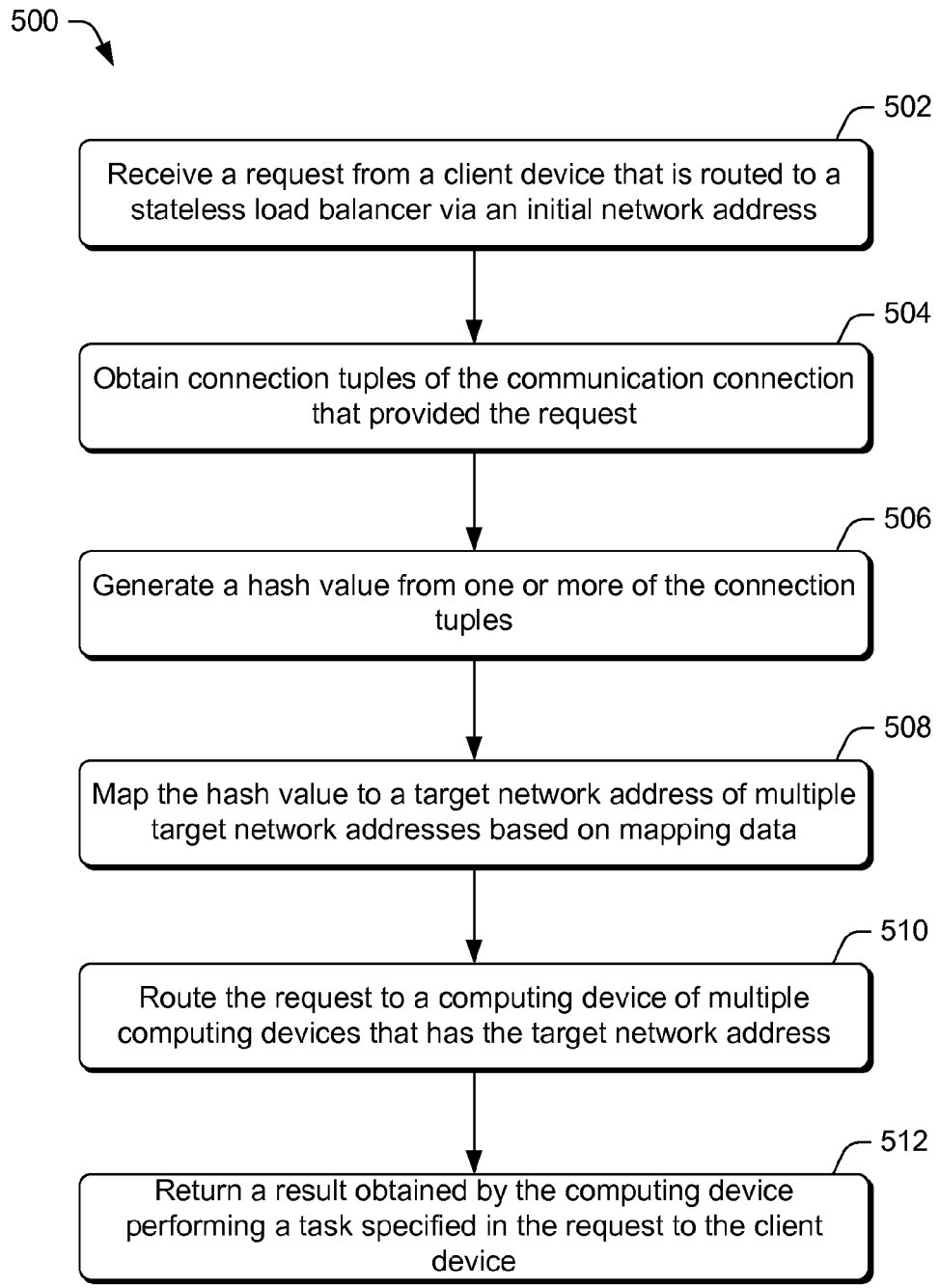
FIG. 5 is a flow diagram of an illustrative process for using a stateless one-to-many mapping of an initial network address to target network addresses to route a request to a particular computing device.

FIG. 5 is a flow diagram of an illustrative process 500 for using a stateless one-to-many mapping of an initial network address to target network addresses to route a request to a particular computing device. At block 502, the stateless load balancer 108 may receive a request 112 from a client device, such as the client device 114. The request 112 may have been routed to the stateless load balancer 108 via an initial network address that is a public destination IP address. In various embodiments, the public destination IP address may be an IP address of the stateless load balancer 108, or an intermediate device that received the request 112 and passed the request 112 to the stateless load balancer 108.

At block 504, the stateless load balancer 108 may obtain the connection tuples 118 of the communication connection that provided the request 112. In various embodiments, the connection tuples 118 may include the source IP 120, the destination IP 122, the source port 124, the destination port 126, and the protocol 128, and/or other connection information that may in combination uniquely identify the corresponding request 112. In various embodiments, a routing device, such as the routing device 116(1), may obtain the connection tuples 118.

At block 506, the stateless load balancer 108 may generate a hash value from one or more of the connection tuples 118. The hash value may be generated using a simple hash function, a cryptographic hash function, or any other type of hash function. The hash value may be generated by the routing device that obtained the connection tuples 118, such as the routing device 116(1).

At block 508, the stateless load balancer 108 may map the hash value to a correlating target network address of multiple target network addresses based on mapping data 134. In some embodiments, the mapping data 134 may include the direct correlations between hash values and target network addresses. In other embodiments, the mapping data may include correlations between modulo values derivable from the hash values and target network addresses. In such embodiments, the stateless load balancer 108 may use a modulo function to convert the obtained hash value into a modulo remainder for the purpose of mapping.

At block 510, the stateless load balancer 108 may route the request 112 to a computing device that has the correlating target network address. The computing device may be one of multiple computing devices 104(1)-104(N) in the data processing cluster 102. The request 112 is to be executed by the computing device with the correlating target network address, such as the computing device 104(1).

At block 512, the stateless load balancer 412 may return a result obtained by the computing device performing a task specified in the request 112 to the client device 114. In various embodiments, the result may be data (e.g., web page) that is retrieved from a data store, an acknowledgement that data has been stored into a data store, values that are calculated, and/or so forth.

Figure 6:
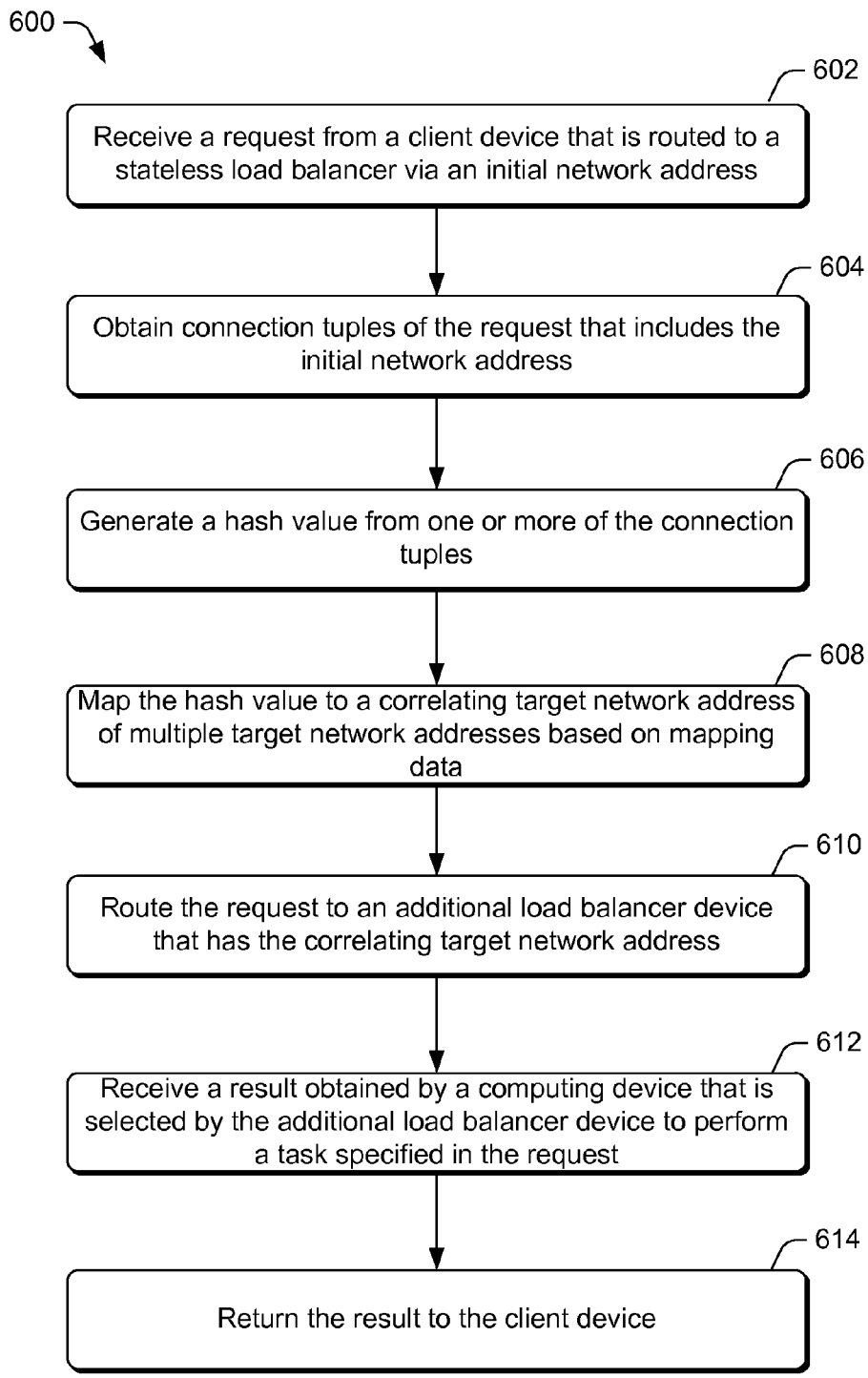
FIG. 6 is a flow diagram of an illustrative process for using a stateless one-to-many mapping of an initial network address to target network addresses to route a request to a load balancer device for performance by a computing device selected by the load balancer device.

FIG. 6 is a flow diagram of an illustrative process 600 for using a stateless one-to-many mapping of an initial network address to target network addresses to route a request to a load balancer device for performance by a computing device selected by the load balancer device.

At block 602, the stateless load balancer 108 may receive a request 112 from a client device, such as the client device 114. The request 112 may have been routed to stateless load balancer 108 via an initial network address that is a public destination IP address. In various embodiments, the public destination IP address may be an IP address of the stateless load balancer 108, or an intermediate device that received the request 112 and passed the request 112 to the stateless load balancer 108.

At block 604, the stateless load balancer 108 may obtain the connection tuples 118 of the request 112 that include the initial network address in the form of the public destination IP address. In various embodiments, the connection tuples 118 may include the source IP 120, the destination IP 122, the source port 124, the destination port 126, and the protocol 128, and/or one or other connection tuples that may in combination uniquely identify the corresponding request 112. In various embodiments, a routing device, such as the routing device 116(1), may obtain the connection tuples 118.

At block 606, the stateless load balancer 108 may generate a hash value from one or more of the connection tuples 118. The hash value may be generated using a simple hash function, a cryptographic hash function, or any other type of hash function. The hash value may be generated by the routing device that obtained the connection tuples 118, such as the routing device 116(1).

At block 608, the stateless load balancer 108 may map the hash value to a correlating target network address based on mapping data. In some embodiments, the mapping data may include direct correlations between hash values and target network addresses. In other embodiments, the mapping data may include correlations between modulo values derivable from the hash values and target network addresses. In such embodiments, the stateless load balancer 108 may use a modulo function to convert the obtained hash value into a modulo remainder for the purpose of mapping.

At block 610, the stateless load balancer 108 may route the request 112 to an additional load balancer device that has the correlating target network address. The additional load balancer device may be one of multiple load balancers in the load balancer layer 310, such as the load balancer device 308(1). In various embodiments, the additional load balancer device may be a stateless load balance or a stateful load balancer.

At block 612, the stateless load balancer 108 may receive a result obtained by a computing device. The computing device may have been selected by the additional load balancer device to perform a task specified in the request 112. In various embodiments, the result may be data (e.g., web page) that is retrieved from a data store, an acknowledgement that data has been stored into a data store, values that are calculated, and/or so forth. At block 614, the stateless load balancer 108 may return the result to the client device 114 that originated the request 112.

Figure 7:
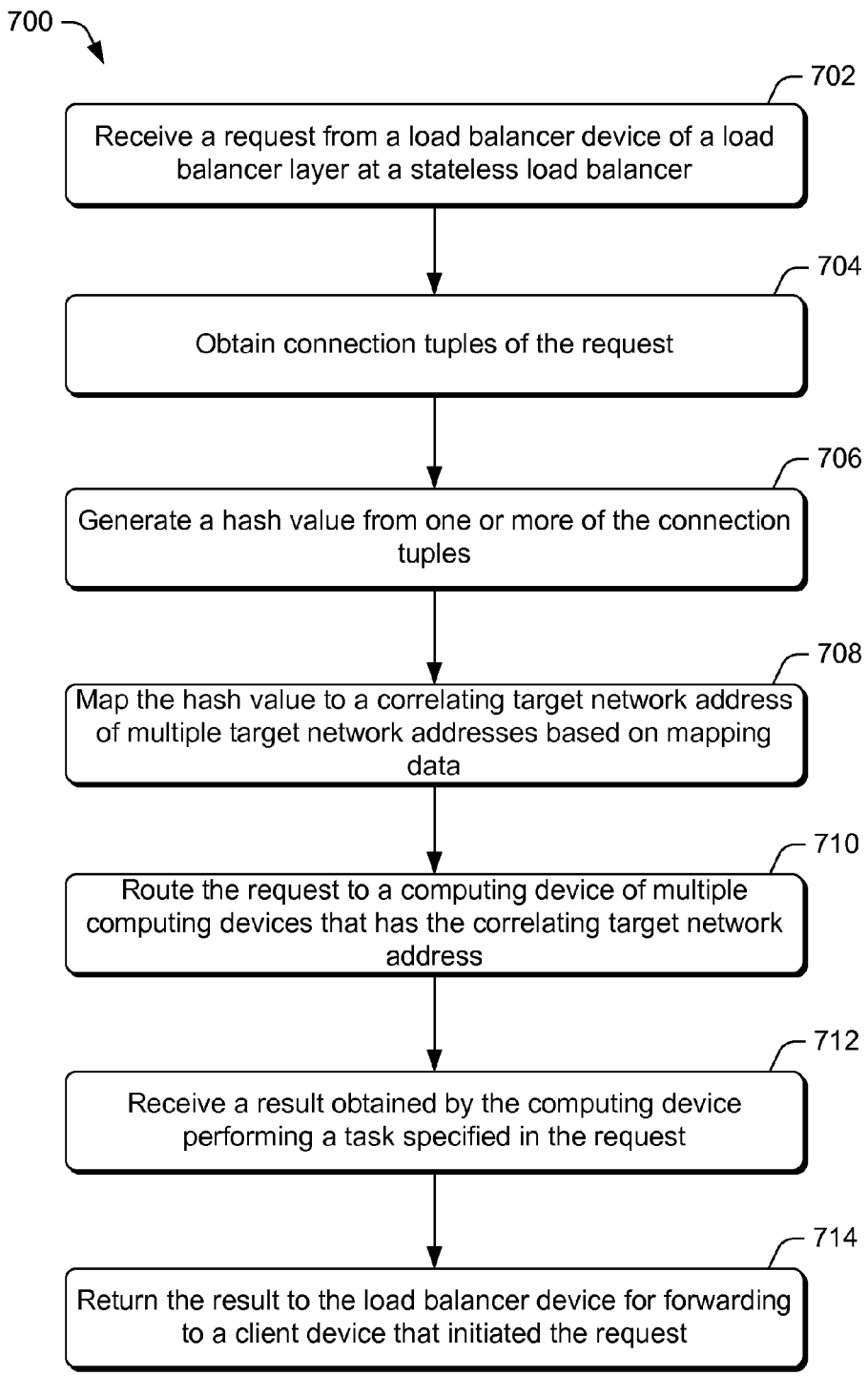
FIG. 7 is a flow diagram of an illustrative process for using a stateless one-to-many mapping of an initial network address to target network addresses to route a request assigned by a load balancer to a computing device.

FIG. 7 is a flow diagram of an illustrative process 700 for using a stateless one-to-many mapping of an initial network address to target network addresses to route a request assigned by a load balancer to a computing device. At block 702, the stateless load balancer 108 may receive a request from a load balancer device of a load balancer layer. For example, the stateless load balancer 108 may receive the request 406 from the load balancer device 402(1) of the load balancer layer 404. The request may be originated by the client device 408.

At block 704, the stateless load balancer 108 may obtain the connection tuples of the communication connection that delivered the request. In various embodiments, the connection tuples may include a source IP address, a destination IP address, a source port number, a destination number, a protocol type, and/or one or other connection tuples that may in combination uniquely identify the corresponding request 406. In various embodiments, a routing device, such as the routing device 116(1), may obtain the connection tuples.

At block 706, the stateless load balancer 108 may generate a hash value from one or more of the connection tuples. The hash value may be generated using a simple hash function, a cryptographic hash function, or any other type of hash function. The hash value may be generated by the routing device that obtained the connection tuples, such as the routing device 116(1).

At block 708, the stateless load balancer 108 may map the hash value to a correlating target network address of multiple target network addresses based on mapping data 134. In some embodiments, the mapping data 134 may include direct correlations between hash values and target network addresses. In other embodiments, the mapping data may include correlations between modulo values derivable from the hash values and target network addresses. In such embodiments, the stateless load balancer 108 may use a modulo function to convert the obtained hash value into a modulo remainder for the purpose of mapping.

At block 710, the stateless load balancer 108 may route the request 406 to a computing device that has the correlating target network address. The computing device may be one of multiple computing devices 104(1)-104(N) in the data processing cluster 102. The request 406 is to be executed by the computing device with the correlating target network address, such as the computing device 104(1).

At block 712, the stateless load balancer 108 may receive a result that is obtained by the computing device performing a task specified in the request 406. In various embodiments, the result may be data (e.g., web page) that is retrieved from a data store, an acknowledgement that data has been stored into a data store, values that are calculated, and/or so forth.

At block 714, the stateless load balancer 108 may return the result to the load balancer device of the load balancer layer for forwarding to a client device that initiated the request. For example, the stateless load balancer 108 may return the result that is generated by the computing device 104(1) to the load balancer device 402(1), so that the load balancer device 402(1) may return the result to the client device 408.

Figure 8:
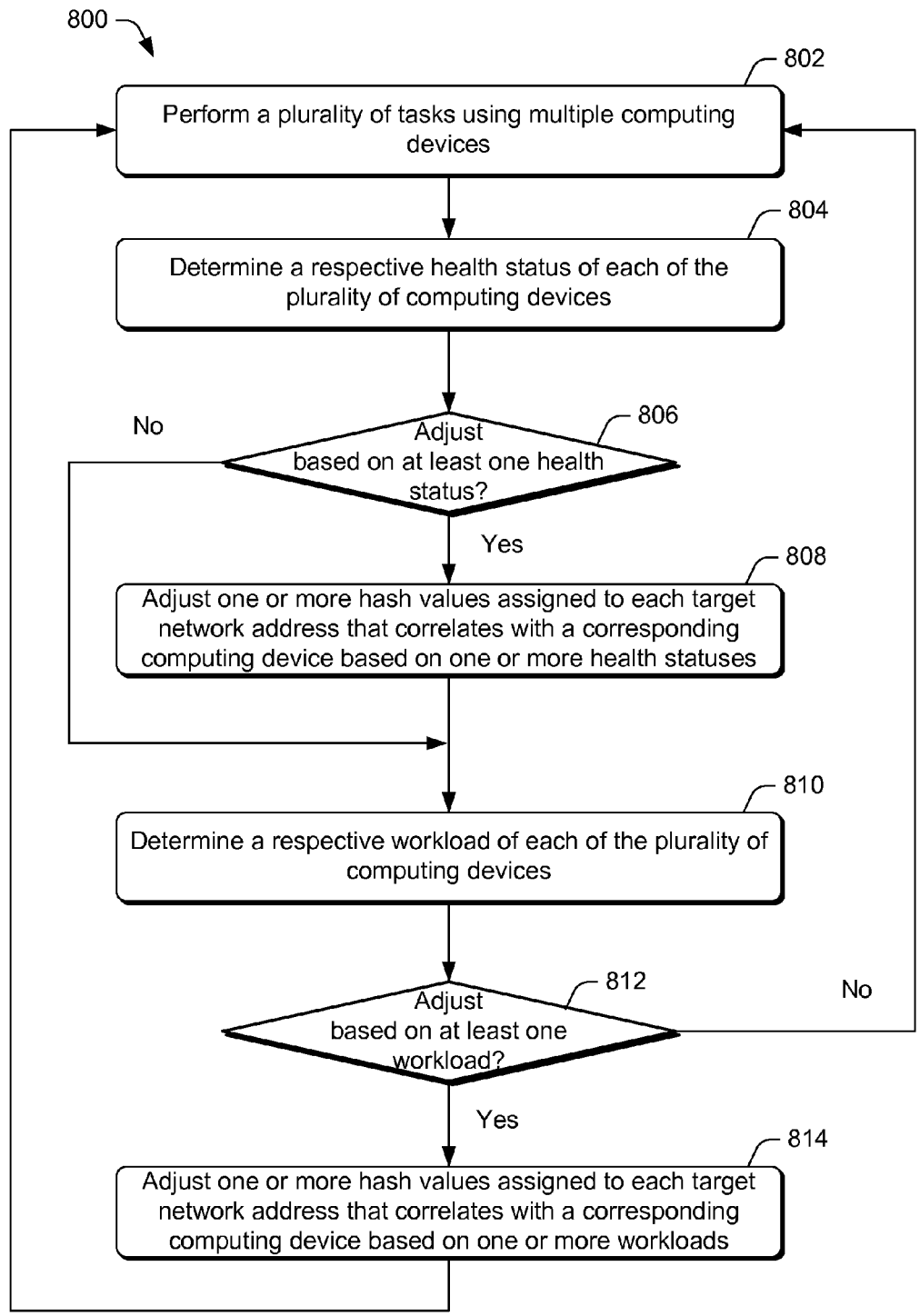
FIG. 8 is a flow diagram of an illustrative process for adjusting workloads assigned to each of multiple computing devices based on at least one of device health status or work load.

FIG. 8 is a flow diagram of an illustrative process 800 for adjusting workloads assigned to each of multiple computing devices based on at least one of device health status or work load. In various embodiments, the multiple computing devices may be the computing devices 104(1)-104(N) of the data processing cluster 102.

At block 802, the computing devices 104(1)-104(N) may perform a plurality of tasks using the multiple computing devices. The tasks may be performed in response to requests initiated by client devices and distributed to the computing devices 104(1)-104(N) by the stateless load balancer 108. For example, a request 112 from the client device 114 may be distributed to the computing device 104(1) by the stateless load balancer 108.

At block 804, the health monitor module 216 of the stateless load balancer 108 may determine a respective health status of each of the computing devices 104(1)-104(N). In various embodiments, the health status of a computing device may be determined based on health parameters such as response time to read/write requests, the lifetime numbers of read and/or writes executed by the hardware associated with the computing device, the accumulated operation time of the hardware, the power consumption of the hardware, the operating temperature of the hardware, and/or so forth.

At decision block 806, the health monitor module 216 may determine whether correlations between hash values and target network addresses in the mapping data 134 are to be adjusted based on at least one health status. For example, the health monitor module 216 may determine that an adjustment is to be made if there is an indication that at least one computing device has failed or is predicted to fail. Thus, if the health monitor module 216 determines that an adjustment is to be made ("yes" at decision block 806), the process may proceed to block 808.

At block 808, the health monitor module 216 may command the assignment module 220 to adjust one or more hash values assigned to each target network address that correlates with a corresponding computing device. The adjustments may be made based on the at least one health status, and may be accomplished directly with modification of one or more hash value to target network address correlations, or indirectly with modification of one or more modulo value to target network address correlations. For example, the adjustments may include associating a set of hash values that are currently correlated with a first target network address with a second target network address, redistributing a set of hash values across more or fewer computing devices, and/or so forth. In some embodiments, the routing correction module 222 may correct any request execution problems resulting from the adjustments.

However, if the health monitor module 216 determines that no adjustment is to be made ("no" at decision block 806), the process 800 may proceed to block 810. For example, the health monitor module 216 may determine that no adjustment is to be made when the health statuses of the computing devices 104(1)-104(N) are normal.

At block 810, the dynamic feedback module 218 of the stateless load balancer 108 may determine a respective workload of each of the computing devices 104(1)-104(N) in a predetermined period of time. For example, a particular computing device may be executing tasks at maximum capacity, while another computing device may be periodically idle.

At decision block 812, the dynamic feedback module 218 may determine whether correlations between hash values and target network addresses in the mapping data 134 are to be adjusted based on at least one workload. For example, by monitoring the workloads, the dynamic feedback module 218 may detect imbalances in the workloads of the computing devices 104(1)-104(N) and/or determine whether the number of computing devices 104(1)-104(N) is to be scaled up or scaled down due to workload demand.

At block 814, the dynamic feedback module 218 may command the assignment module 220 to adjust one or more hash values assigned to each target network address that correlates with a corresponding computing device. The adjustments may be made based on the workloads to correct any workload imbalance, and/or to scale up or scale down the number of computing devices 104(1)-104(N) in response to workload demand in the predetermined time period. The adjustments may be accomplished directly with modification of one or more hash value to target network address correlations, or indirectly with modification of one or more modulo value to target network address correlations. For example, the adjustments may include associating a set of hash values that are currently correlated with a first target network address with a second target network address, redistributing a set of hash values across more or fewer computing devices, and/or so forth. In some embodiments, the routing correction module 222 may correct any request execution problems resulting from the adjustments.

Subsequently, the process 800 may loop back to block 802 so that additional tasks are performed by the computing device 104(1)-104(N). However, returning to the decision block 812, if the dynamic feedback module 218 determines that no adjustment is to be made ("no" at decision block 812), the process 800 may also loop back to block 802.

In summary, a stateless load balancer as described herein may offer superior performance than conventional stateful load balancers. A stateful load balancer tracks the states of communication connections used by requests in order to route the requests. Accordingly, a computing device that is used to implement a stateful load balancer may devote large amounts of memory space and processing power to track such data in order to route the requests. Further, when such a computing device fails, the states tracked by the computing device and the associated communication connections may be irrevocably lost.

In contrast, because the stateless load balancer does not track state information in order to route requests, the stateless load balancer may be immune to failures caused by the loss of state information, and may offer faster performance while using the same amount of computing resources. Further, the lack of necessity to track state information also means that the stateless load balancer may be scaled up or down based on workload demand with minimal disruption to the execution of the existing workload.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A stateless load balancer comprising:
one or more processors; and
memory storing components executable by the one or more processors, the components perform acts comprising:
receiving a request that is initiated by a client device, the request being transported to the stateless load balancer via a communication connection;
obtaining connection tuples of the communication connection;
generating a hash value from the connection tuples;
mapping the hash value to a first network address of a first computing device, based at least in part on mapping data;
updating the mapping such that the hash value is mapped to a second network address of a second computing device; and
routing the request to the second computing device.

2. The stateless load balancer of claim 1, wherein the mapping data correlates the first network address associated with the first computing device to the hash value.

3. The stateless load balancer of claim 1, wherein the receiving includes receiving the request from a stateful load balancer that tracks state information of the communication connection to route the request to the stateless load balancer.

4. The stateless load balancer of claim 1, wherein the connection tuples of the communication connection includes one or more of a source IP address, a source port number, a destination port number, or a protocol type.

5. The stateless load balancer of claim 1, wherein connection tuples used to generate the hash value uniquely identify the request.

6. The stateless load balancer of claim 1, wherein the acts further comprise:
determining at least a health status of the first computing device,
wherein updating the mapping comprises updating the mapping based on the health status of the first computing device.

7. The stateless load balancer of claim 1, wherein updating the mapping further comprise modifying the mapping data to disassociate the hash value from the first network address of the first computing device and assign the hash value to the second network address.

8. The stateless load balancer of claim 1, wherein the acts further comprise:
determining a first health status of the first computing device and a second health status of the second computing device,
wherein updating the mapping comprises:
updating the mapping of the hash value based at least in part on the first health status and the second health status.

9. A computer-implemented method comprising:
receiving a request that is initiated by a client device, the request being received via a communication connection that includes an initial network address of the client device;
obtaining connection tuples of the communication connection that transported the request;
generating a hash value from one or more connection tuples of the connection tuples of the communication connection;
mapping the hash value to a target network address based at least in part on mapping data;
routing the request to a computing device that is associated with the target network address, wherein the computing device is a load balancer device, wherein the routing of the request includes routing the request to the load balancer device
receiving a result obtained by an additional computing device that is selected by the load balancer device to perform a task specified in the request, and
returning the result obtained by the additional computing device to the client device.

10. The computer-implemented method of claim 9, wherein the mapping data correlates a corresponding target network address of each computing device to one or more respective hash values.

11. The computer-implemented method of claim 9, wherein the connection tuples of the communication connection include one or more of a source IP address, a source port number, a destination port number, or a protocol type.

12. A computer-implemented method comprising:
receiving a request that is initiated by a client device, the request being received via a communication connection that includes an initial network address of the client device;
obtaining connection tuples of the communication connection that transported the request;
generating a hash value from one or more connection tuples of the connection tuples of the communication connection;
mapping the hash value to a first target network address based at least in part on mapping data;
determining at least one of a workload or a health status of the a first computing device associated with the first target address;
updating an assignment of the hash value to a second target network address in the mapping data based at least in part on at least one of the workload or the health status to redistribute workloads between computing devices; and
routing the request to a second computing device that is associated with the second target network address.

13. The computer-implemented method of claim 12, wherein the updating includes modifying the mapping data by disassociating the hash value from the first target network address of the first computing device and assigning the hash value to the second target network address of the second computing device.

14. A stateless load balancer comprising:
one or more processors; and
memory storing components executable by the one or more processors, the components perform acts comprising:
receiving a request that is initiated by a client device, the request being transported to the stateless load balancer via a communication connection;
obtaining connection tuples of the request;
generating a hash value from the connection tuples;
mapping the hash value to a first network address of a first computing device;
determining a first workload of the first computing device and a second workload of a second computing device;
updating the mapping of the hash value based at least in part on the first workload and the second workload; and
routing the request to the second computing device.

15. A system, comprising:
a plurality of computing devices;
a stateless load balancer comprising a plurality of routing devices,
wherein a first routing device is configured to:
receive a first request initiated by a client device via a first communication connection,
generate a first hash value from one or more first connection tuples of the first request, and
map the first hash value to a first target network address,
wherein a second routing device is configured to:
receive a second request initiated by the client device via a second communication connection,
generate a second hash value from one or more second connection tuples of the second request,
map the second hash value to a second target network address,
wherein in response to the one or more first connection tuples of the first request being same as the one or more second connection tuples of the second request, the first target network address is the same as the second target network address.

16. The system of claim 15, wherein:
the first routing device is further configured to route the first request to a computing device of the plurality of computing devices that is associated with the first target network address; and
the second routing device is further configured to route the second request to the computing device of the plurality of computing devices that is associated with the second target network address.

17. The system of claim 16, wherein the first target network address is a network address of the computing device or a subnet that includes the computing device.

18. The system of claim 16, wherein the first routing device is configured to return, to the client device, a result that is obtained by the computing device performing a task specified in the first request.

* * * * *